(12) United States Patent
Debban et al.

(10) Patent No.: US 10,989,888 B2
(45) Date of Patent: Apr. 27, 2021

(54) FLEXIBLE RIBBON STRUCTURE AND METHOD FOR MAKING

(71) Applicant: OFS Fitel, LLC, Norcross, GA (US)

(72) Inventors: Harold P Debban, Snellville, GA (US); Timothy Goddard, Newnan, GA (US); Heng Ly, Stone Mountain, GA (US)

(73) Assignee: OFS FITEL, LLC, Norcross, GA (US)

( * ) Notice: Subject to any disclaimer, the term of this patent is extended or adjusted under 35 U.S.C. 154(b) by 43 days.

(21) Appl. No.: 15/404,259

(22) Filed: Jan. 12, 2017

(65) Prior Publication Data
US 2017/0219790 A1    Aug. 3, 2017

Related U.S. Application Data

(60) Provisional application No. 62/290,082, filed on Feb. 2, 2016.

(51) Int. Cl.
*G02B 6/44* (2006.01)
*B05D 1/02* (2006.01)

(52) U.S. Cl.
CPC .............. *G02B 6/4403* (2013.01); *B05D 1/02* (2013.01); *G02B 6/443* (2013.01)

(58) Field of Classification Search
CPC ......... G02B 6/4403; G02B 6/443; B05D 1/02
See application file for complete search history.

(56) References Cited

U.S. PATENT DOCUMENTS

| | | | | |
|---|---|---|---|---|
| 4,612,228 A | * | 9/1986 | Kato | D04H 1/64 428/151 |
| 4,878,732 A | * | 11/1989 | Rohner | G02B 6/4403 385/106 |
| 4,952,020 A | * | 8/1990 | Huber | G02B 6/4403 174/117 R |
| 5,117,281 A | * | 5/1992 | Katsuraoka | H01L 23/367 257/722 |
| 5,212,756 A | * | 5/1993 | Eoll | G02B 6/4403 385/109 |
| 5,375,766 A | * | 12/1994 | Sweeney | B05B 7/1606 219/230 |
| 5,382,312 A | * | 1/1995 | Raterman | A61F 13/15699 118/313 |
| 5,442,722 A | * | 8/1995 | DeCarlo | G02B 6/4404 385/114 |

(Continued)

*Primary Examiner* — Peter Radkowski
(74) *Attorney, Agent, or Firm* — John M. Herman, Esq.; Smith Tempel Blaha, LLC

(57) ABSTRACT

Embodiments of the invention include a method for making a partially bonded optical fiber ribbon. The method includes providing a linear array of optical fibers, and applying a bonding matrix material randomly to at least a portion of at least two adjacent optical fibers. The bonding matrix material is applied randomly to the adjacent optical fibers in such a way that the linear array of optical fibers forms a partially bonded optical fiber ribbon. The bonding matrix material applied randomly to the adjacent optical fibers is dense enough to allow the resulting partially bonded optical fiber ribbon to lay substantially flat. Also, the bonding matrix material applied randomly to the adjacent optical fibers is sparse enough to allow the resulting partially bonded optical fiber ribbon to be rolled into a substantially circular shape.

10 Claims, 7 Drawing Sheets

(56) References Cited

U.S. PATENT DOCUMENTS

| | | | | |
|---|---|---|---|---|
| 5,458,721 A * | 10/1995 | Raterman | A61F 13/15699 | 156/164 |
| 5,540,804 A * | 7/1996 | Raterman | A61F 13/15699 | 118/313 |
| 5,682,454 A * | 10/1997 | Gaillard | G02B 6/4403 | 174/117 F |
| 5,720,908 A * | 2/1998 | Gaillard | G02B 6/448 | 174/117 F |
| 6,360,044 B1 * | 3/2002 | Mills | G02B 6/4482 | 101/35 |
| 6,621,964 B2 * | 9/2003 | Quinn | G02B 6/4429 | 385/105 |
| 7,187,830 B2 * | 3/2007 | Blazer | G02B 6/4404 | 385/100 |
| 7,776,414 B2 * | 8/2010 | Iwasaki | A61J 1/2093 | 206/0.5 |
| 8,412,014 B2 * | 4/2013 | Sato | G02B 6/4495 | 385/114 |
| 8,435,600 B2 * | 5/2013 | Burmester | B05B 7/0861 | 427/207.1 |
| 8,548,294 B2 * | 10/2013 | Toge | G02B 6/441 | 385/114 |
| 8,787,718 B2 * | 7/2014 | Tanabe | G02B 6/4403 | 385/114 |
| 9,114,596 B2 * | 8/2015 | MacPherson | B32B 7/14 | |
| 9,389,382 B2 * | 7/2016 | Blazer | G02B 6/4403 | |
| 10,185,110 B2 * | 1/2019 | Kaneko | G02B 6/44 | |
| 2002/0172477 A1 * | 11/2002 | Quinn | G02B 6/4429 | 385/104 |
| 2005/0013573 A1 * | 1/2005 | Lochkovic | G02B 6/4402 | 385/128 |
| 2005/0221034 A1 * | 10/2005 | Iwasaki | A61J 1/2093 | 428/35.7 |
| 2005/0281518 A1 * | 12/2005 | Tanaka | G02B 6/448 | 385/114 |
| 2006/0133749 A1 * | 6/2006 | Blazer | G02B 6/4404 | 385/114 |
| 2007/0099531 A1 * | 5/2007 | Efremova | A61F 13/56 | 442/370 |
| 2007/0141302 A1 * | 6/2007 | Theurl | B05C 5/0204 | 428/116 |
| 2009/0186152 A1 * | 7/2009 | Shiau | G02B 6/0043 | 427/163.2 |
| 2010/0269972 A1 * | 10/2010 | Iwasaki | A61J 1/2093 | 156/69 |
| 2010/0296781 A1 * | 11/2010 | Sato | G02B 6/4495 | 385/114 |
| 2011/0110635 A1 * | 5/2011 | Toge | G02B 6/441 | 385/102 |
| 2011/0171410 A1 * | 7/2011 | Nakagawa | C09J 7/026 | 428/41.3 |
| 2012/0039550 A1 * | 2/2012 | MacPherson | B32B 7/14 | 383/109 |
| 2012/0048447 A1 * | 3/2012 | Burmester | B05B 7/0861 | 156/62.2 |
| 2013/0156390 A1 * | 6/2013 | Matsuzawa | G02B 6/4403 | 385/114 |
| 2013/0221021 A1 * | 8/2013 | Tani | C09J 7/38 | 221/73 |
| 2014/0016905 A1 * | 1/2014 | Tanabe | G02B 6/4403 | 385/114 |
| 2014/0112631 A1 * | 4/2014 | Namazue | G02B 6/44 | 385/114 |
| 2015/0044455 A1 * | 2/2015 | Konagai | B29C 70/12 | 428/338 |
| 2015/0321461 A1 * | 11/2015 | MacPherson | B32B 7/14 | 156/229 |
| 2015/0346445 A1 * | 12/2015 | Blazer | G02B 6/4433 | 385/114 |
| 2016/0299310 A1 * | 10/2016 | Kaneko | G02B 6/44 | |

* cited by examiner

FLEXIBLE RIBBON STRUCTURE AND METHOD FOR MAKING

STATEMENT REGARDING RELATED APPLICATIONS

This patent application claims priority under 35 U.S.C. § 119(e) to U.S. Provisional Patent Application Ser. No. 62/290,082, filed on Feb. 2, 2016, entitled, "Flexible Ribbon Structure Having Matrix Material Applied Randomly to a Linear Fiber Array," the entire contents which are hereby incorporated by reference.

BACKGROUND OF THE INVENTION

Field of Invention

The invention relates to optical fibers. More particularly, the invention relates to flexible optical fiber ribbon structures and methods for making flexible optical fiber ribbon structures.

Description of Related Art

Mass fusion splicing makes the use of optical fiber ribbons attractive in relatively very high fiber count cable structures, as this technology allows splicing of 12 ribbonized fibers in approximately the same time as is required to splice two or three individual fibers. Optical fiber ribbons are optical fibers bonded together as a (typically) flat ribbon of optical fibers. There are now market requirements for cables having at least 1000 to 5000 optical fibers.

The cabling of conventional flat optical fiber ribbons becomes more problematic as the number of flat optical fiber ribbon being cabled increases. Conventionally, flat optical fiber ribbons are grouped into rectangular arrays, often referred to as stacks, and positioned within a cable structure. However, optical fiber cables usually need to be circular to be easily installed. Thus, the square peg, i.e., the rectangular ribbon stack, must fit in the round hole, i.e., the circular cable structure. Such conventional configurations lead to empty space in the cable structure.

Some existing optical fiber cable manufacturers have developed a partially bonded optical fiber ribbon, also referred to as a rollable ribbon, where the optical fibers forming the optical fiber ribbon are not bonded over their entire length. The optical fibers are bonded intermittently, thus allowing the optical fiber ribbon to be folded or rolled into an approximately cylindrical shape, allowing for better filling of the circular cable, resulting in more optical fibers to be included in a given cable diameter compared to optical fiber cables with conventional fully bonded ribbon structures.

However, conventional partially bonded optical fiber ribbon structures have various issues associated with their manufacture. Optical fibers within a conventional partially bonded optical fiber ribbon structure are bonded together using one or more precise patterns. However, the bonding patterns must be dense enough to allow the optical fiber ribbon to be unrolled flat during slicing of the optical fibers, but sparse enough to make the optical fiber ribbon structure flexible and to not induce an unacceptable amount of optical attenuation due to the regularity of the bonding pattern.

Also, the application of precise bonding patterns in the manufacture of conventional partially bonded optical fiber ribbons has unacceptable manufacturing line speed penalties. For example, the line speed for manufacturing conventional partially bonded optical fiber ribbons using precise bonding patterns is approximately half, or less than half, of the line speed for manufacturing conventional optical fiber ribbons that are fully bonded.

SUMMARY OF THE INVENTION

The invention is embodied in a method for making a partially bonded optical fiber ribbon. The method includes providing a linear array of optical fibers, and applying a bonding matrix material randomly to at least a portion of at least two adjacent optical fibers. The bonding matrix material is applied randomly to the adjacent optical fibers in such a way that the linear array of optical fibers forms a partially bonded optical fiber ribbon. The bonding matrix material applied randomly to the adjacent optical fibers is dense enough to allow the resulting partially bonded optical fiber ribbon to be able to lay substantially flat. Also, the bonding matrix material applied randomly to the adjacent optical fibers is sparse enough to allow the resulting partially bonded optical fiber ribbon to be rolled into a substantially circular shape.

DETAILED DESCRIPTION OF EXEMPLARY EMBODIMENTS

Figure 1A:
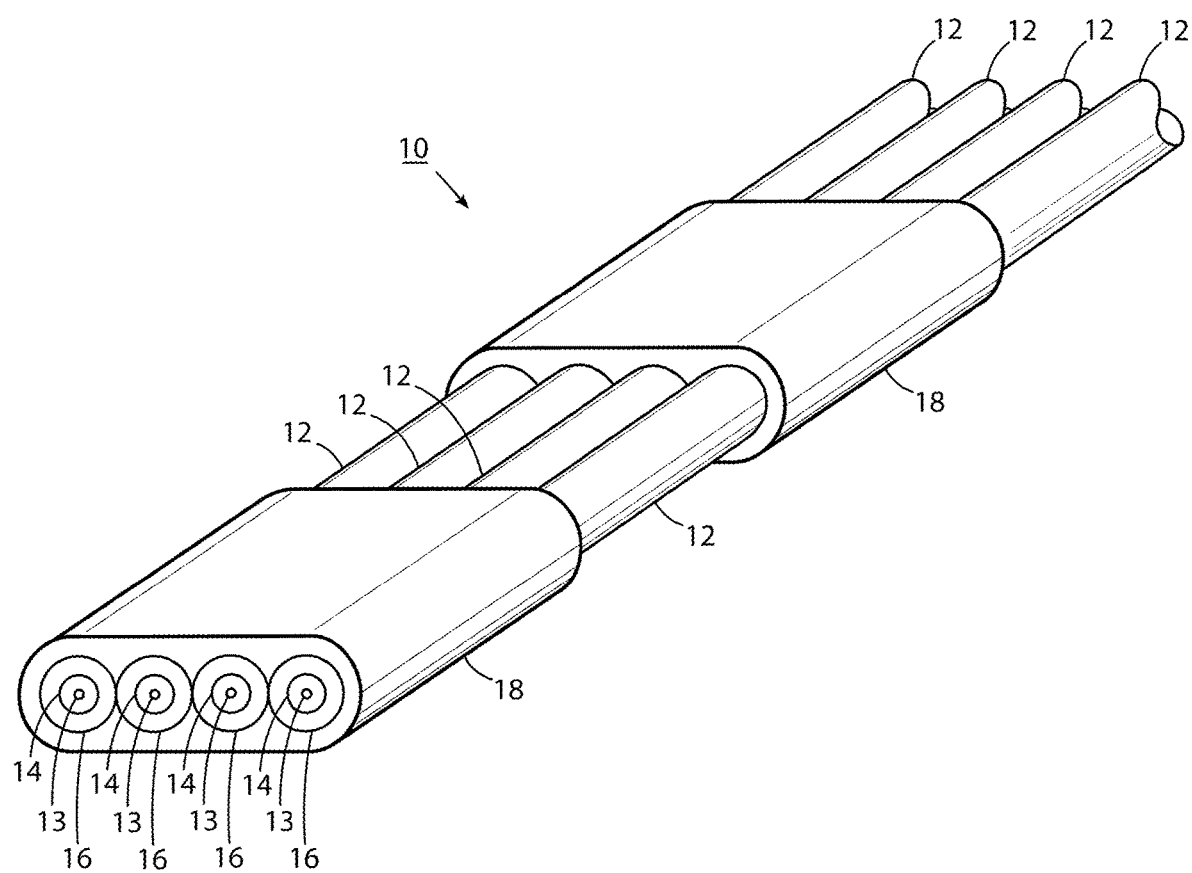
FIG. 1A is a perspective view of a conventional partially bonded optical fiber ribbon.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

FIG. 1A is a perspective view of a conventional partially bonded optical fiber ribbon 10. As shown, the ribbon 10 includes a plurality of optical fibers 12, with each optical fiber 12 having a core portion 13, a cladding portion 14 surrounding the core portion 13, and a coating portion 16 surrounding the cladding portion 14. The core portion 13 and the cladding portion 14 are made of glass. The coating portion 16, which is made of plastic or an ultraviolet (UV) curable acrylate material, protects the core portion 13 and the cladding portion 14 from breaking. In this optical fiber ribbon 10, the periphery of the optical fibers 12 are intermittently covered with a ribbon matrix portion 18, if the matrix material is relatively soft but tough.

Figure 1B:
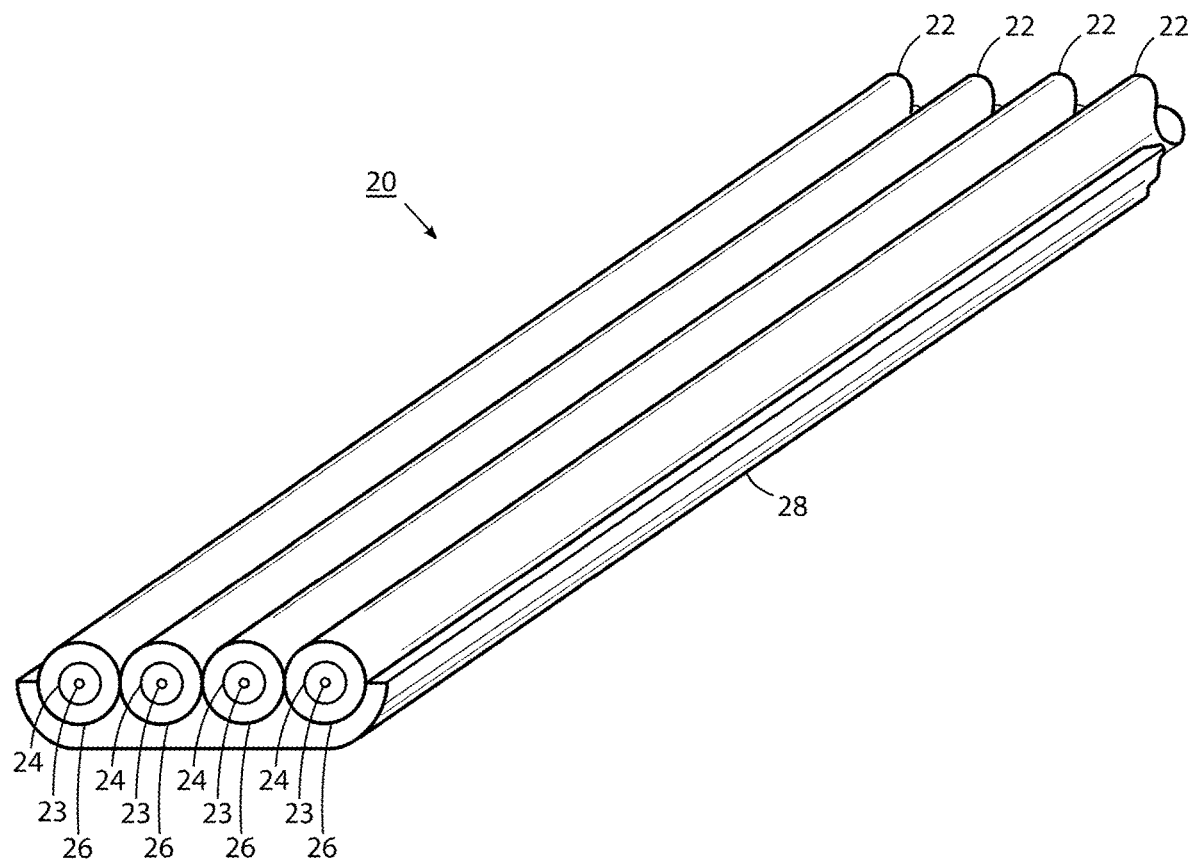
FIG. 1B is a perspective view of another conventional partially bonded optical fiber ribbon.

FIG. 1B is a perspective view of another conventional partially bonded optical fiber ribbon 20. The optical fiber ribbon 20 in FIG. 1B includes a plurality of optical fibers 22, with each optical fiber 22 having a core portion 23, a cladding portion 24 surrounding the core portion 23, and a coating portion 26 surrounding the cladding portion 24. In this optical fiber ribbon 20, a portion of the periphery of the optical fibers 22 are covered with a ribbon matrix portion 28 along the entire length of the optical fibers 22, if the matrix material is relatively soft but tough.

Figure 1C:
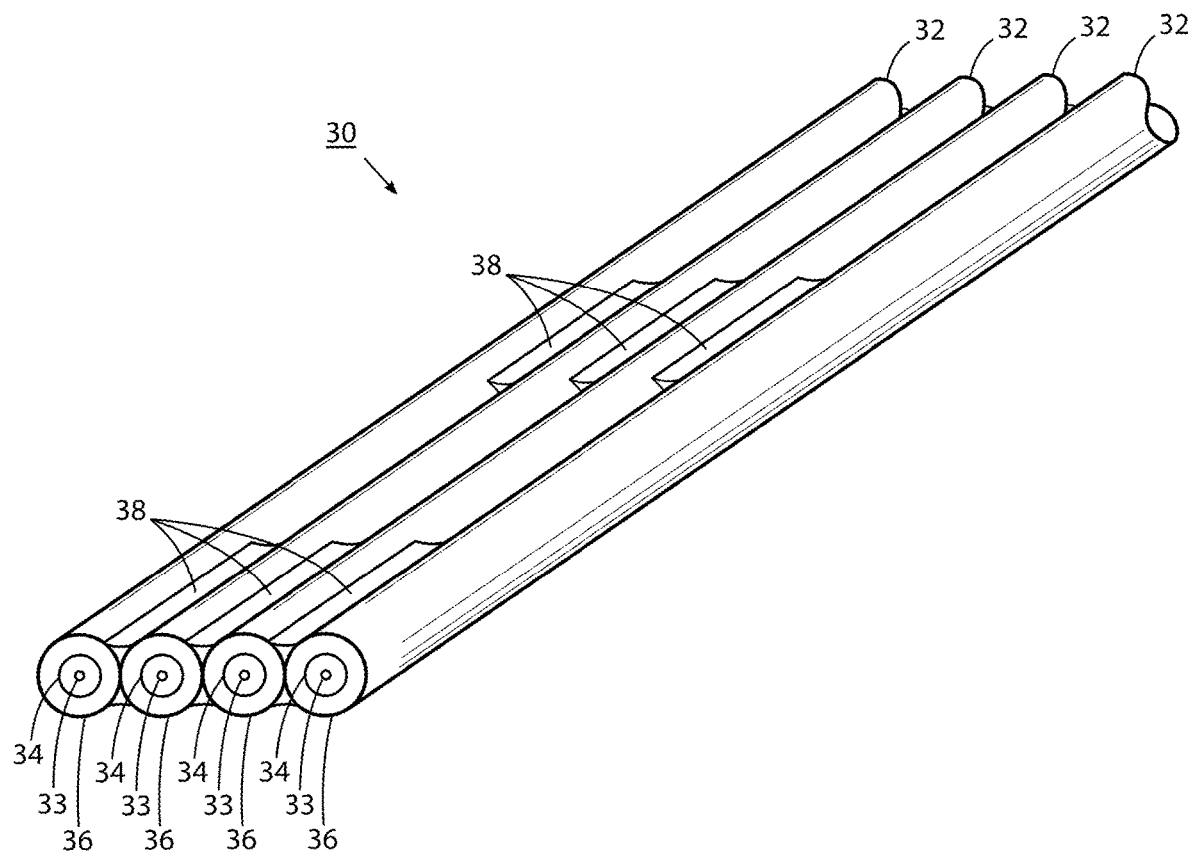
FIG. 1C is a perspective view of yet another conventional partially bonded optical fiber ribbon.

FIG. 1C is a perspective view of yet another conventional partially bonded optical fiber ribbon 30. The optical fiber ribbon 30 in FIG. 1B includes a plurality of optical fibers 32, with each optical fiber 32 having a core portion 33, a cladding portion 34 surrounding the core portion 33, and a coating portion 36 surrounding the cladding portion 34. In this optical fiber ribbon 30, a portion of the periphery of the optical fibers 32 are intermittently covered with a ribbon matrix portion 38. As shown, the ribbon matrix portions 38 are uniformly displaced along the periphery of the optical fibers 32. The optical fiber ribbon 30 can be made by applying dots of matrix material in a pattern before curing, slicing a standard ribbon very precisely with a blade, or inserting pins to intermittently block the flow of liquid prepolymer matrix material.

As discussed hereinabove, conventional partially bonded optical fiber ribbons, also referred to as rollable ribbons, are bonded together with matrix material using one or more precise patterns. For example, some conventional partially bonded optical fiber ribbons are manufactured using a screen printing method to apply a precise pattern of bonding matrix material to the optical fibers. This conventional method is relatively mechanically complex and requires a relatively sophisticated measurement device to determine if there are any manufacturing issues associated with the resulting optical fiber ribbons.

Other conventional methods used to manufacture partially bonded optical fiber ribbons involve the use of mechanical devices to cut portions of bonding matrix material from a fully bonded optical fiber ribbon, resulting in a partially bonded optical fiber ribbon. Still other conventional methods used to manufacture partially bonded optical fiber ribbons involve the use of mechanical devices to block the flow of bonding matrix material across a portion of the width of the optical fiber ribbon as the optical fiber ribbon is fabricated, resulting in a partially bonded optical fiber ribbon.

These conventional methods require a relatively great amount of precision to be executed properly. Furthermore, the relatively precise nature of these conventional methods can cause optical fiber attenuation increases in the fibers within the ribbon. Also, these conventional methods often fail to eliminate some of the preferential bending inherent in the optical fiber ribbon structure.

According to embodiments of the invention, a linear array of optical fibers is partially bonded with a bonding matrix material in a random or pseudo-random manner to form a flexible, partially bonded optical fiber ribbon structure. That is, the bonding matrix material is applied to the linear array of optical fibers in a non-uniform manner. The bonding matrix material is applied randomly or pseudo-randomly to the optical fibers in such a way that the bonding matrix material is dense enough across the linear array of optical fibers to allow the resulting partially bonded optical fiber ribbon to be able to lay substantially flat. Also, the bonding matrix material is applied randomly or pseudo-randomly to the optical fibers in such a way that the bonding matrix material is sparse enough across the linear array of optical fibers to allow the resulting partially bonded optical fiber ribbon to be flexible enough to be rolled into a substantially circular shape.

The random or pseudo-random application of bonding matrix material to the linear array of optical fibers to form a flexible, partially bonded optical fiber ribbon structure eliminates the need for precisely controlling the application or removal of bonding matrix material to the optical fibers, as is required in conventional methods for manufacturing partially bonded optical fiber ribbons. Compared to conventional methods for manufacturing partially bonded optical fiber ribbons, the random or pseudo-random application of bonding matrix material to the linear array of optical fibers to form a flexible, partially bonded optical fiber ribbon structure results in greater line speeds, reduced manufacturing scrap bonding matrix material, improved attenuation performance, and a more flexible ribbon structure.

According to embodiments of the invention, the bonding matrix material is applied randomly or pseudo-randomly to the linear array of optical fibers in any suitable manner. For example, the bonding matrix material is applied randomly or pseudo-randomly to the linear array of optical fibers using a commercially available spray nozzle. Using a spray nozzle, the bonding matrix material is applied randomly or pseudo-randomly to the linear array of optical fibers, e.g., in a random, overlapping spiral manner, or other suitable random or pseudo-random manner. The use of one or more attachments to the spray nozzle provides various different random or pseudo-random applications of the bonding matrix material to the linear array of optical fibers.

Alternatively, the bonding matrix material is applied randomly or pseudo-randomly to the linear array of optical fibers using a commercially available ink-jet printer, such as a dot matrix ink-jet printer. Using an ink-jet printer, the bonding matrix material is applied randomly or pseudo-randomly to the linear array of optical fibers, e.g., according to an algorithm or other suitable manner to randomize or pseudo-randomize the application of the bonding matrix material to the linear array of optical fibers.

According to embodiments of the invention, filaments or dots of bonding matrix material are applied to the linear array of optical fibers randomly or pseudo-randomly, in any suitable manner. The random or pseudo-random application of bonding matrix material to the linear array of optical fibers to form a flexible, partially bonded optical fiber ribbon structure eliminates the need for precision control of the placement of the bonding regions on the optical fibers. The random or pseudo-random application of bonding matrix material to the linear array of optical fibers to form a flexible, partially bonded optical fiber ribbon structure also eliminates the need to measure and identify precise patterns of bonding matrix material for application to the linear array of optical fibers.

The bonding matrix material can be any suitable material that bonds together a linear array of optical fibers into an optical fiber ribbon. For example, the bonding matrix material can be any suitable ultraviolet curable resin, thermosetting resin, thermoplastic resin, or other suitable bonding matrix material. Also, the bonding matrix material typically has a viscosity of between 2000-7000 millipascal-sec (mPa-sec) measured at 25 degrees Celsius (° C.).

Figure 2:
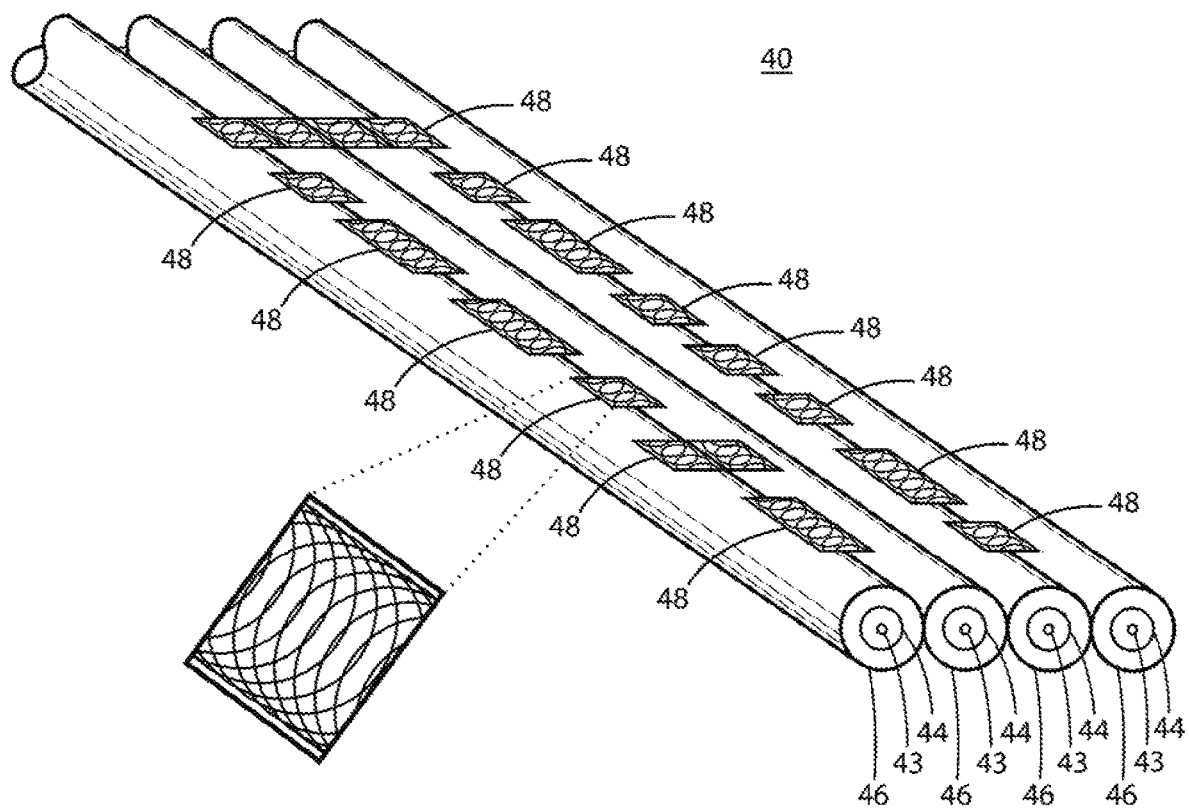
FIG. 2 is a perspective view of a flexible, partially bonded optical fiber ribbon structure having bonding matrix material applied randomly to periodic portions of a linear optical fiber array, according to embodiments of the invention.

FIG. 2 is a perspective view of a flexible, partially bonded optical fiber ribbon structure 40 having bonding matrix material applied randomly to periodic portions of a linear optical fiber array, according to embodiments of the invention. The optical fiber ribbon structure 40 includes a linear array of optical fibers 42, with each optical fiber 42 having a core portion 43, a cladding portion 44 surrounding the core portion 43, and a coating portion 46 surrounding the cladding portion 44. The core portion 43 and the cladding portion 44 are made of glass. The coating portion 46, which is made of plastic or an ultraviolet (UV) curable acrylate material, protects the core portion 43 and the cladding portion 44 from breaking. The linear array of optical fibers 42 can include any suitable number of optical fibers, e.g., 4 fibers (as shown) or 12 fibers.

In the optical fiber ribbon structure 40, portions of the periphery of adjacent optical fibers 42 are randomly or pseudo-randomly covered with a bonding matrix material 48. As shown, the bonding matrix material 48 is not applied to the linear array of optical fibers 42 in any uniform manner, but rather is applied to periodic portions of the linear array of optical fibers 42 randomly or pseudo-randomly.

For example, as shown, the bonding matrix material 48 can be applied across a portion of any two (or more) adjacent optical fibers 42 within the linear array of optical fibers 42 at random locations along the length of the adjacent optical fibers 42. As shown, the bonding matrix material 48 can be applied as one or more random spirals across a portion of two (or more) adjacent optical fibers 42 within the linear array of optical fibers 42 at random locations along the length of the adjacent optical fibers 42, e.g., as the result of a spray nozzle (or other suitable means) applying the bonding matrix material 48 to the linear array of optical fibers 42. The one or more random spirals may or may not overlap, depending on the type of spray nozzle used to apply the bonding matrix material 48 to the linear array of optical fibers 42.

Figure 3:
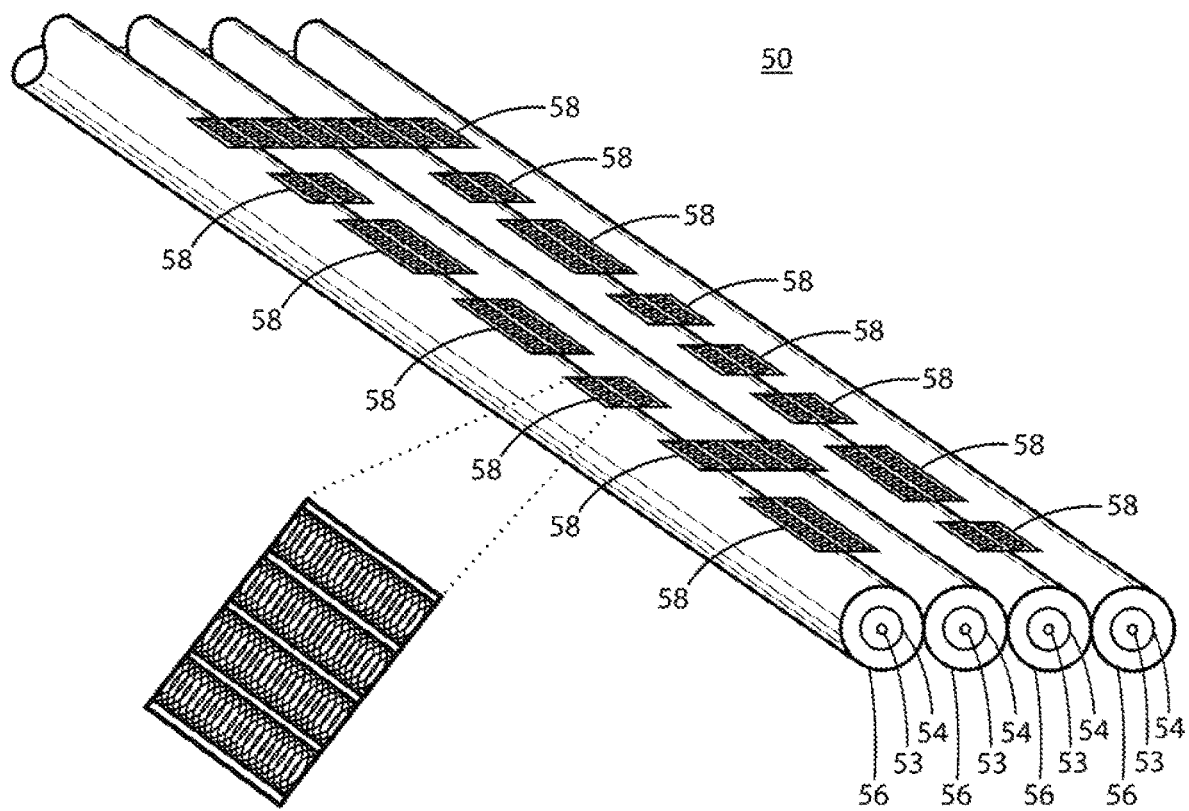
FIG. 3 is a perspective view of another flexible, partially bonded optical fiber ribbon structure having bonding matrix material applied randomly to periodic portions of a linear optical fiber array, according to embodiments of the invention.

FIG. 3 is a perspective view of another flexible, partially bonded optical fiber ribbon structure 50 having bonding matrix material applied randomly to periodic portions of a linear optical fiber array, according to embodiments of the invention. The optical fiber ribbon structure 50 includes a linear array of optical fibers 52, with each optical fiber 52 having a core portion 53, a cladding portion 54 surrounding the core portion 53, and a coating portion 56 surrounding the cladding portion 54. The core portion 53 and the cladding portion 54 are made of glass. The coating portion 56, which is made of plastic or an ultraviolet (UV) curable acrylate material, protects the core portion 53 and the cladding portion 54 from breaking. The linear array of optical fibers 52 can include any suitable number of optical fibers, e.g., 4 fibers (as shown) or 12 fibers.

In the optical fiber ribbon structure 50, portions of the periphery of adjacent optical fibers 52 are randomly or pseudo-randomly covered with a bonding matrix material 58. As shown, the bonding matrix material 58 is not applied to the linear array of optical fibers 52 in any uniform manner, but rather is applied to periodic portions of the linear array of optical fibers 52 randomly or pseudo-randomly.

For example, as shown, the bonding matrix material 58 can be applied across a portion of two (or more) adjacent optical fibers 52 within the linear array of optical fibers 52 at random locations along the length of the adjacent optical fibers 52. As shown, the bonding matrix material 58 can be applied as a plurality of random spirals across a portion of two (or more) adjacent optical fibers 52 within the linear array of optical fibers 52 at random locations along the length of the adjacent optical fibers 52, e.g., as the result of a spray nozzle (or other suitable means) applying the bonding matrix material 58 to the linear array of optical fibers 52. The plurality of random spirals may or may not overlap, depending on the type of spray nozzle used to apply the bonding matrix material 58 to the linear array of optical fibers 52.

Figure 4:
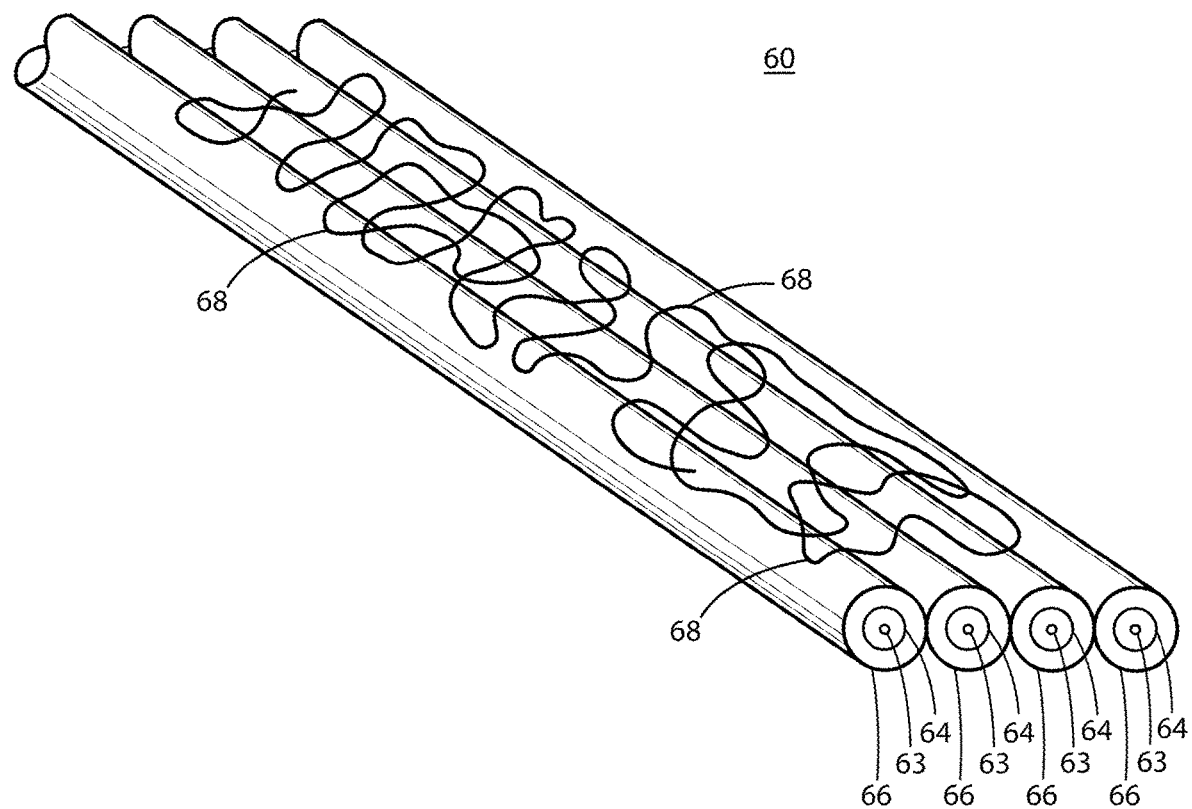
FIG. 4 is a perspective view of yet another flexible, partially bonded optical fiber ribbon structure having bonding matrix material applied randomly to periodic portions of a linear optical fiber array, according to embodiments of the invention.

FIG. 4 is a perspective view of yet another flexible, partially bonded optical fiber ribbon structure 60 having bonding matrix material applied randomly to periodic portions of a linear optical fiber array, according to embodiments of the invention. The optical fiber ribbon structure 60 includes a linear array of optical fibers 62, with each optical fiber 62 having a core portion 63, a cladding portion 64 surrounding the core portion 63, and a coating portion 66 surrounding the cladding portion 64. The core portion 63 and the cladding portion 64 are made of glass. The coating portion 66, which is made of plastic or an ultraviolet (UV) curable acrylate material, protects the core portion 63 and the cladding portion 64 from breaking. The linear array of optical fibers 62 can include any suitable number of optical fibers, e.g., 4 fibers (as shown) or 12 fibers.

In the optical fiber ribbon structure 60, portions of the periphery of adjacent optical fibers 62 are randomly or pseudo-randomly covered with a bonding matrix material 68. As shown, the bonding matrix material 68 is not applied to the linear array of optical fibers 62 in any uniform manner, but rather is applied to periodic portions of the linear array of optical fibers 62 randomly or pseudo-randomly.

For example, as shown, the bonding matrix material 68 can be applied across a portion of two (or more) adjacent optical fibers 62 within the linear array of optical fibers 62 at random locations along the length of the adjacent optical fibers 62. As shown, the bonding matrix material 68 can be applied as a completely random pattern across a portion of two (or more) adjacent optical fibers 62 within the linear array of optical fibers 62 at random locations along the length of the adjacent optical fibers 62, e.g., as the result of a spray nozzle (or other suitable means) applying the bonding matrix material 68 to the linear array of optical fibers 62.

Alternatively, in any of the optical fiber ribbon structures 40, 50, 60, the bonding matrix material can be applied as one or more random filaments or dots across any two or more adjacent optical fibers within the linear array of optical fibers. The random filaments or dots of bonding matrix material can be applied to the linear array of optical fibers as the result of an ink-jet printer, a solenoid valve, or other suitable means for applying filaments or dots of bonding matrix material to the linear array of optical fibers. Also, the random filaments or dots of bonding matrix material can be applied periodically or continuously along the length of the linear array of optical fibers.

According to embodiments of the invention, the bonding matrix material is applied to the linear array of optical fibers at a minimum density of 1 dot of bonding matrix material per 25 millimeters of fiber array surface area. Preferably, the bonding matrix material is applied to the linear array of optical fibers in a manner that provides an average of at least one dot of bonding matrix material per 15 millimeters of fiber array surface area, with a near normal distribution of dots of bonding matrix material. However, the distance between adhesive dots of bonding matrix material should be no more than 100 millimeters.

Figure 5:
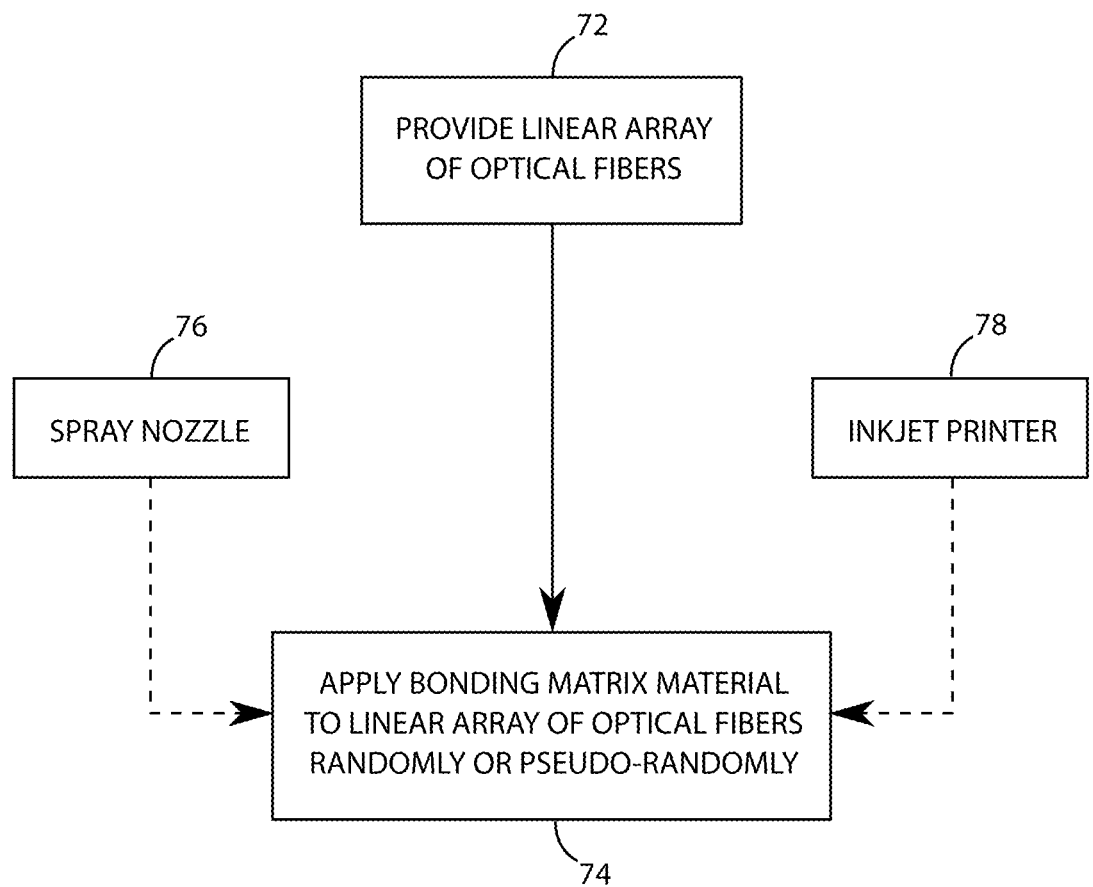
FIG. 5 is a flow diagram of a method for making a flexible, partially bonded optical fiber ribbon structure having bonding matrix material applied randomly to a linear optical fiber array, according to embodiments of the invention.

FIG. 5 is a flow diagram of a method 70 for making a flexible, partially bonded optical fiber ribbon structure having bonding matrix material applied randomly to a linear optical fiber array, according to embodiments of the invention. The method 70 includes a step 72 of providing a linear array of optical fibers. As discussed hereinabove, the linear array of optical fibers can include any suitable number of optical fibers, e.g., 4 optical fibers or 12 optical fibers, arranged in a linear array.

The method 70 also includes a step 74 of applying a bonding matrix material randomly to at least a portion of two or more adjacent optical fibers. As discussed hereinabove, the bonding matrix material is applied randomly or pseudo-randomly across the adjacent optical fibers in such a way that the linear array of optical fibers forms a partially bonded optical fiber ribbon.

According to embodiments of the invention, the bonding matrix material is applied randomly or pseudo-randomly across two or more adjacent optical fibers in such a way that the bonding matrix material is dense enough to allow the resulting partially bonded optical fiber ribbon to be able to lay substantially flat. Also, the bonding matrix material is applied randomly or pseudo-randomly across the adjacent optical fibers in such a way that the bonding matrix material is sparse enough to allow the resulting partially bonded optical fiber ribbon to be rolled into a substantially circular shape.

The method 70 also can include a step 76 of applying the bonding matrix material randomly or pseudo-randomly across two or more adjacent optical fibers using a spray nozzle, with or without one or more attachments. As discussed hereinabove, using a spray nozzle, the bonding matrix material is applied randomly or pseudo-randomly to the linear array of optical fibers, e.g., in a random, overlapping spiral manner, or other suitable random or pseudo-random manner. Also, the use of one or more attachments to the spray nozzle provides various different random or pseudo-random applications of the bonding matrix material to the linear array of optical fibers.

The method 70 also can include a step 78 of applying the bonding matrix material randomly across two or more adjacent optical fibers using an ink-jet printer, such as a dot matrix ink-jet printer. As discussed hereinabove, using an ink-jet printer, the bonding matrix material is applied randomly or pseudo-randomly to the linear array of optical fibers, e.g., according to an algorithm or other suitable manner to randomize or pseudo-randomize the application of the bonding matrix material to the linear array of optical fibers.

It will be apparent to those skilled in the art that many changes and substitutions can be made to the embodiments of the invention herein described without departing from the spirit and scope of the invention as defined by the appended claims and their full scope of equivalents.

The invention claimed is:

1. A partially bonded optical fiber ribbon, comprising:
a plurality of optical fibers arranged adjacent to one another in a linear array; and
a plurality of matrix material portions randomly applied to periodic portions of at least two adjacent optical fibers in such a way that the applied matrix material portions do not form a predetermined pattern,
wherein the matrix material portions are applied randomly to periodic portions of at least two adjacent optical fibers in such a way that the linear array of optical fibers forms a partially bonded optical fiber ribbon,
wherein the matrix material portions are applied randomly to periodic portions of at least two adjacent optical fibers independent of any reference line,
wherein each matrix material portion has a first end segment coupled to a first optical fiber, a second end segment coupled to a second optical fiber adjacent to the first optical fiber, and a middle segment between the first end segment and the second end segment, wherein the middle segment is neither coupled to the first optical fiber nor coupled to the second optical fiber and forms an area of spacing underneath the matrix material portion and between the first optical fiber and the second optical fiber,
wherein the matrix material portions applied randomly to periodic portions of at least two adjacent optical fibers is dense enough to allow the resulting partially bonded optical fiber ribbon to lay substantially flat, and
wherein the matrix material portions applied randomly to periodic portions of at least two adjacent optical fibers is sparse enough to allow the resulting partially bonded optical fiber ribbon to be rolled into a substantially circular shape.

2. The partially bonded optical fiber ribbon as recited in claim 1, wherein the matrix material portions are applied across two or more adjacent optical fibers within the linear array of optical fibers at random locations along the length of the two or more adjacent optical fibers.

3. The partially bonded optical fiber ribbon as recited in claim 1, wherein the matrix material portions are applied to periodic portions of at least two adjacent optical fibers using a spray nozzle.

4. The partially bonded optical fiber ribbon as recited in claim 1, wherein the matrix material portions are applied to periodic portions of at least two adjacent optical fibers using an ink-jet printer.

5. The partially bonded optical fiber ribbon as recited in claim 1, wherein the matrix material portions are applied to periodic portions of at least two adjacent optical fibers in a pseudo-random manner.

6. The partially bonded optical fiber ribbon as recited in claim 1, wherein the matrix material portions further comprise filaments or dots of the bonding matrix material applied across two or more adjacent optical fibers within the linear array of optical fibers at random locations along the length of the two or more adjacent optical fibers.

7. The partially bonded optical fiber ribbon as recited in claim 1, wherein the matrix material is a material selected from the group consisting of an ultraviolet curable resin, a thermosetting resin, and a thermoplastic resin.

8. The partially bonded optical fiber ribbon as recited in claim 1, wherein the matrix material has a viscosity of between 2000-7000 millipascal-sec (mPa-sec) measured at 25 degrees Celsius (° C.).

9. The partially bonded optical fiber ribbon as recited in claim 6, wherein at least one dot of matrix material is applied per 25 millimeters of surface area of the linear array of optical fibers.

10. The partially bonded optical fiber ribbon as recited in claim 6, wherein the distance between adhesive dots of matrix material applied to the linear array of optical fibers is no more than 100 millimeters.

* * * * *